United States Patent
Buchanan et al.

(10) Patent No.: US 6,665,674 B1
(45) Date of Patent: Dec. 16, 2003

(54) FRAMEWORK FOR OPEN DIRECTORY OPERATION EXTENSIBILITY

(75) Inventors: James H. Buchanan, Ottawa (CA); Robert T. Gibson, Ottawa (CA); Bruce E. Dunn, Ottawa (CA); Brian D. Connell, Ottawa (CA); Ian A. Macfarlane, Stittsville (CA); Scott E. Miller, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/496,049

(22) Filed: Feb. 2, 2000

(51) Int. Cl.[7] .............................................. G06F 17/30
(52) U.S. Cl. ..................... 707/10; 707/103; 709/203; 709/315
(58) Field of Search .............................. 707/10, 103 R, 707/3, 1, 103; 709/315, 203; 379/88.12

(56) References Cited

U.S. PATENT DOCUMENTS

| | | | |
|---|---|---|---|
| 5,893,107 A | | 4/1999 | Chan et al. ................. 707/103 |
| 5,983,234 A | | 11/1999 | Tietjen et al. .............. 707/103 |
| 6,073,175 A | * | 6/2000 | Tavs et al. .................. 709/226 |
| 6,154,743 A | * | 11/2000 | Leung et al. ................ 707/10 |
| 6,345,266 B1 | * | 2/2002 | Ganguly et al. ............. 707/1 |
| 6,347,312 B1 | * | 2/2002 | Byrne et al. ................. 707/3 |
| 6,442,546 B1 | * | 8/2002 | Biliris et al. ................ 707/10 |

OTHER PUBLICATIONS

Cheng et al., Directory–Enabled Network Management Framework For Battlefield Networks, Military Communications Conf. Proceedings, IEEE, p. 1171–1175 vol. 2, Oct. 1999.*

* cited by examiner

Primary Examiner—Greta Robinson
(74) Attorney, Agent, or Firm—Max R. Wood; Ogilvy Renault

(57) ABSTRACT

Methods and apparatus are provided for processing messages for access to information stored in an open directory. A Lightweight Directory Access Protocol (LDAP) LDAP Validation Proxy (LVP) is used to intercept LDAP request messages intended for the directory, validates the LDAP requests according to a schema description and optionally provides side-effects. The schema validation and LDAP message processing is modularized according to object classes representing the data stored in the directory and according to services provided. The schema is enforced by validating LDAP messages. This modularization provides a controlled message processing granularity and enables multi-threaded concurrent processing of multiple LDAP messages. The LVP has the capability of generating LDAP requests in processing LDAP messages. The LVP also intercepts and processes LDAP responses issued by a directory and intended for clients.

59 Claims, 6 Drawing Sheets

FRAMEWORK FOR OPEN DIRECTORY OPERATION EXTENSIBILITY

CROSS-REFERENCE TO RELATED APPLICATIONS

This application relates to application entitled GENERIC REGISTRATION OF PLUG-INS FOR A DIRECTORY SERVER, filed on Dec. 30, 1999 and assigned Ser. No. 09/474,763, the specification of which is hereby incorporated by reference.

TECHNICAL FIELD

The invention relates to apparatus and methods for client access to information stored in an open directory and, in particular, to a framework for open directory extensibility that enables pre-processing and post-processing of operations used to access the information stored in the open directory.

BACKGROUND OF THE INVENTION

Directory servers known in the art store information in connected hierarchical tree structures. Information records held in a directory are only limited by rules imposed by a directory schema that govern any particular record type. Pointers can be set between a point in the directory and any other point in the directory. Although the rules imposed by the directory schema perform general directory data validation, the validation checks are not comprehensive in current directory server implementations.

A Lightweight Directory Access Protocol (LDAP) is an emerging Internet Engineering Task Force (IETF) standard which is gaining popularity in the industry as a mechanism by which to access a directory. The IETF LDAP specification itself provides a protocol for accessing information held by a persistent store, such as a directory.

A schema specification defines managed objects and attributes. These objects and attributes are specified through a data dictionary that provides a standard set of object classes. An object belongs to one or more object classes which define the attributes of the object. Generally, the schema is extensible by deriving other object classes (e.g. by modifying existing object classes and/or adding new object classes) according to methods known in the art so that the schema specification may be tailored to specific requirements.

The IETF standard provides some facilities to assist interoperability of certain network device management and network service management functionalities. However, an implementer using LDAP is also provided with extensions enabling the specification of vendor-specific schema, and an Application Program Interface (API) which may be used to access the elements of that vendor-specific schema. Once an LDAP schema is published, other implementers have a common mechanism by which that schema may be accessed, for example, by service provisioning, billing, and/or management applications. Various vendors are developing LDAP schema specifications to provide an API which their customers may use to integrate the vendor's equipment and services into the customer's internal service provisioning, management, customer care, billing solutions, and the like.

There are a few areas in which the IETF has either just begun to realize, or has not yet begun to realize the need for LDAP standardization. Such areas are schema validation and LDAP message processing.

LDAP message processing mechanisms can provide means by which schema providers may deliver code that: ensures that updates to a directory information tree are consistent with syntactic and semantic checks which are required for maintaining integrity of information stored in the directory; and perform any necessary side-effect changes which may be required as a result of any particular information access action in providing a service. For example, the deletion of one object may require a cascade of associated changes in other objects. A standardized LDAP message processing mechanism is particularly important for situations where it is desired to provide an LDAP schema and the LDAP protocol as an API for other services. If the schema provider cannot provide the code to enforce consistency checks and required side-effect processing, then it becomes more likely that the information stored in a directory will lose integrity, with unpredictable results. Typically in providing a service a prescribed behavior is specified in processing information access messages. Some of this prescribed behavior can be provided via a designed schema description and other prescribed behavior can be provided via specific execution code.

Some of the current LDAP directory server vendors have addressed the need for schema validation through proprietary APIs in their directory server products. In order to provide multi-vendor LDAP server support, this requires that vendors provide LDAP clients coded to support the differences across all vendor products, as well as support for each vendor's proprietary API set. Moreover, LDAP clients need to have knowledge of the combined schema across all vendors.

Generic (i.e. directory independent) solutions have been proposed which monitor LDAP requests between clients and a directory server, providing access to a directory, to provide directory vendor neutral validation. An example of such solutions includes the LDAP Trigger Access Process Gateway (LTAP gateway) recently proposed by Lucent/Bell Labs. This proposal teaches the use of a "trigger gateway" implementing a proprietary SQL database-based trigger mechanism providing a schema validation limited to proceed/do not proceed decisions. Lucent/Bell Labs are currently seeking patent protection for their solution.

Other related art is described in U.S. Pat. No. 5,983,234 entitled METHOD AND APPARATUS FOR GENERICALLY VIEWING AND EDITING OBJECTS, which issued Nov. 9, 1999 to Tietjen et al.; and U.S. Pat. No. 5,893,107 entitled METHOD AND SYSTEM FOR UNIFORMLY ACCESSING MULTIPLE DIRECTORY SERVICES, which issued Apr. 6, 1999 to Chan et al.

Access to information stored in a central directory server is enabled via a distributed data network, including intranets (local area networks) and internets (wide area networks), from remote client computers executing LDAP aware client software applications. The current implementations, such as the ones mentioned above, teach that the schema be partly enforced by the LDAP client application and partly by the directory server. The more reliance there is on proprietary solutions, such as the ones mentioned above, the greater an overhead created for a user of provided services in keeping up-to-date with the development of the proprietary solutions.

The problem stems from the fact that access to centrally stored information is provided on different vendor directory servers. The complexity of the data access for service offerings provided on multiple directory servers is increased if each directory server is provided by a different vendor.

Directory server vendors are not necessarily service providers. In a competitive environment, various client applications may be required to enable access to a wide range of information. Not only are those various client applications necessary, they also need to be kept up-to-date. Upgrading the various client applications, at different times, to different versions, leads to a high overhead due to financial outlay and time required.

There is therefore a need to provide a framework for open directory extensibility that permits directory independent information access such that directory servers and client applications may be independently developed and maintained.

SUMMARY OF THE INVENTION

It is an object of the invention to provide a framework for open directory extensibility that permits directory independent information access.

It is another object of the invention to provide methods and apparatus for processing directory access messages according to a prescribed process.

It is another object of the invention to enable a schema specification to be implemented and enforced through schema validation in an interoperable manner independent of an underlying directory server implementation.

It is a further object of the invention to enable the implementation of schema consistency checks once and enforcement of the schema specification against all directory client access.

It is a further object of the invention to enable a single entity to validate LDAP messages according to a schema description in a layer interposed between LDAP clients and a directory server.

It is yet another object of the invention to enable a single entity to process directory messages according to a specification defining side-effects, in a layer interposed between directory clients and a directory server.

The invention therefore provides a framework for open directory extensibility that includes first and second messaging entities. The first messaging entity is adapted to send and receive directory messages sent to or received from a directory client. The second messaging entity is adapted to send and receive directory messages sent to or received from a directory server. The framework also includes a directory message decoding engine (decoder) adapted to at least partially decode directory messages received by the first and second messaging entities, and a directory message encoding engine (encoder) adapted to encode LDAP messages. At least one module associated with the framework is adapted to process directory messages based on information conveyed in the message so that an integrity of information stored in the directory is maintained.

The framework in accordance with the invention is preferably a Lightweight Directory Access Protocol (LDAP) Validation Proxy (LVP). The LVP is adapted to enable directory-independent message processing of LDAP messages exchanged between an LDAP client and an LDAP directory. The LVP comprises messaging entity adapted to receive and send LDAP messages to and from the LDAP client and adapted to send and receive LDAP messages to and from the LDAP directory; an LDAP message decoding engine (decoder); an LDAP message encoding engine (encoder); and at least one module adapted to process LDAP messages. The LVP further comprises a decision engine adapted to selectively activate the at least one module in processing LDAP messages. The LVP is adapted to intercept LDAP messages exchanged between the client and the directory. The messaging entity may comprise first and second messaging entities, the first messaging entity being adapted to exchange messages with the LDAP client, and the second messaging entity being adapted to exchange messages with the LDAP server.

According to another aspect of the invention, a method of processing LDAP messages exchanged between an LDAP client and an LDAP directory is provided. The method comprises several steps. At least one message exchanged between the client and the directory is intercepted. The intercepted message is at least partially decoded. Prescribed processes are selectively executed against the intercepted message based on information conveyed in the message. And, the LDAP message is selectively forwarded on completing at least one prescribed process based on a success level of the completion of the prescribed process.

With respect to the success level of the completion of the prescribed process, on detecting an error in processing an LDAP message, an LDAP message containing information about the error is encoded and forwarded towards the LDAP client.

On successfully processing the intercepted LDAP message, the intercepted LDAP message is forwarded. If an error is detected in an intercepted LDAP request message, the message may be modified. The modified message is likewise encoded and forwarded.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference labels.

DETAILED DESCRIPTION OF THE PREFERRED EMBODIMENT

Figure 1:
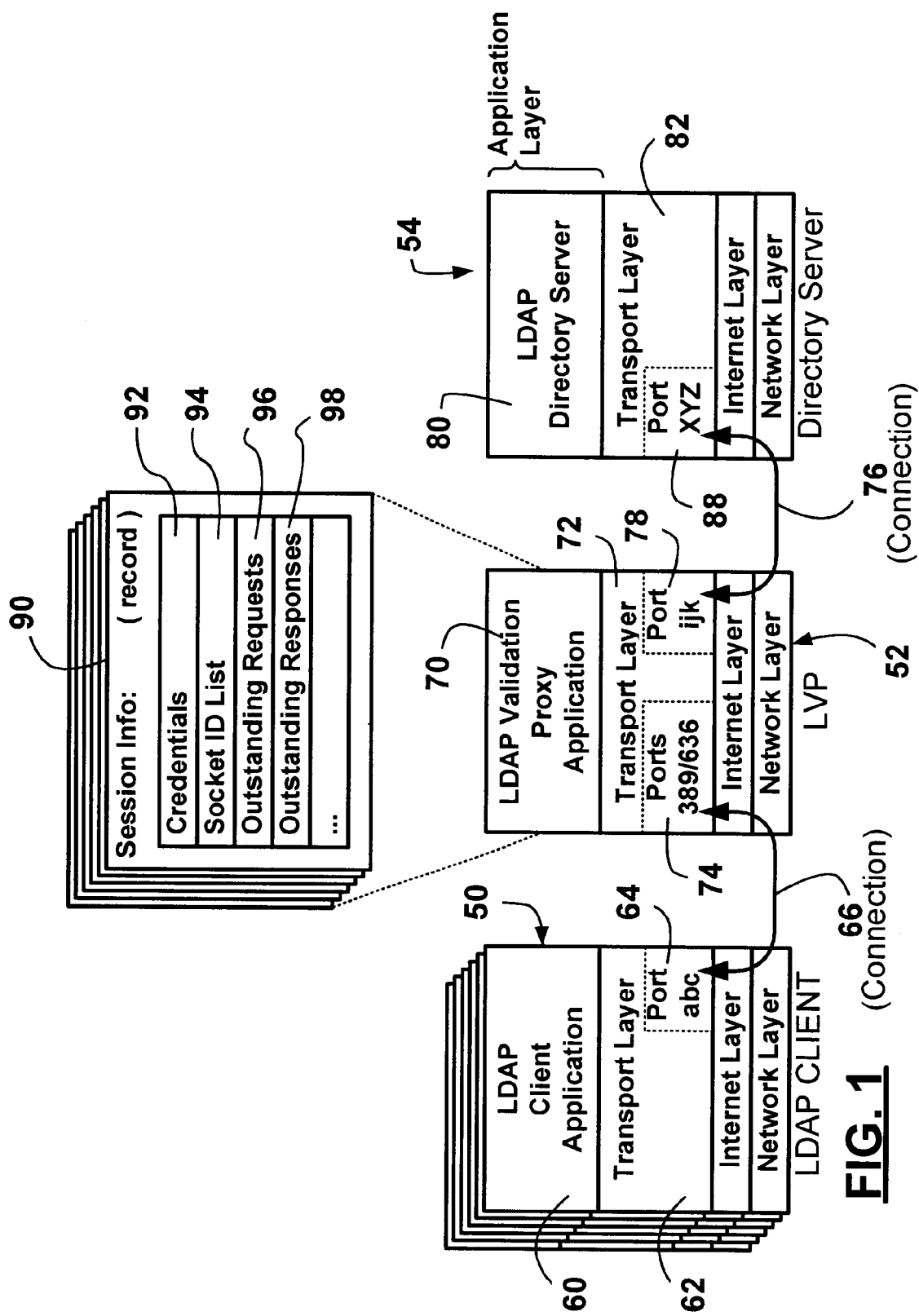
FIG. 1 is a schematic diagram showing an LDAP Validation Proxy, in accordance with an embodiment of the invention, interposed between a client application and a Directory Server.

FIG. 1 shows the relationships between a plurality of Lightweight Directory Access Protocol (LDAP) clients, only one of which is shown at 50, an LDAP Validation Proxy (hereinafter "LVP") shown at 52, and an LDAP directory server shown at 54 (hereinafter "directory server"). The LDAP client 50 comprises a client computer (not shown), or the like, executing an LDAP client software application 60 in conjunction with conventional data communications software and hardware. In this embodiment, data communications and in particular messaging is provided via an Internet Protocol (IP) at the network layer. IP networks fall into two categories namely intranets, also referred to as local area networks, and internets, also referred to as wide area networks. A worldwide wide area network is the Internet. A Transport Control Protocol is typically used over Internet Protocol (TCP/IP) at the transport layer. The invention is not limited to this implementation and applies to any data transport network and data transport protocol enabling messaging between computing applications.

The LDAP client software application 60 is shown layered on top of a transport layer 62 having a messaging entity such as a TCP/IP port represented in the diagram at 64. Data flowing through the TCP/IP port can be unencrypted or encrypted. LDAP messages are conventionally received and transmitted unencrypted on TCP/IP port number 389 and encrypted on TCP/IP port number 636. The LDAP client 50 communicates with the LVP 52 via a TCP/IP connection, as schematically shown at 66.

The LVP 52 comprises an LDAP validation proxy software application 70, itself layered on top of a transport layer 72. The LVP 52 communicates with the LDAP client 50 via the connection 66 using a TCP/IP port 74 having port number 389 for unencrypted data transport and port number 636 for encrypted data transport. The port number used by the LDAP client 50 is shown as, "abc" representing a programmable port number.

Another connection is provided between the LVP 52 and the directory server 54, shown schematically at 76. The LVP 52 and the directory server 54 use TCP/IP ports for conveying messages therebetween. The directory server 54 is provided with a non-standard port number, shown as "XYZ". The TCP/IP port member of TCP/IP port 88 is preferably chosen to be known only to the LDAP directory server application 80 and the LDAP validation proxy application 70, and preferably separate from that of TCP/IP ports 64, 74 used for communication between the LDAP client 50 and the LVP 52. This port number separation is used by the LDAP validation proxy 52 in order to facilitate intercepting conventional LDAP messages between the LDAP client 50 and the directory server 54. The LVP uses TCP/IP port number "ijk" in exchanging messages with the directory server 54.

The directory server 54 comprises an LDAP directory server software application 80 layered on top of a transport layer 82. In the embodiment of FIG. 1, the LVP software application 70 is layered on top of the transport layer 72 which is distinct from the transport layer 82 of the directory server 54. This exemplary implementation therefore suggests that the LDAP validation proxy software application 70 is executing on separate hardware from that of the directory server 54. In this case, the LVP 52 can be thought of as an LDAP validation proxy server 52 as will be expanded on in the present application. This configuration has benefits in that the schema validation and LDAP message processing enabled by the LVP 52 is performed on a separate processor from that of the directory server 52. This enables a processing efficiency in that the LVP 52 can relieve the directory server 54 from processing ill-defined LDAP requests, as will be described below.

The invention is not limited to the illustrated exemplary embodiment. An alternative embodiment can be one in which the LDAP validation proxy application 70 shares a common transport layer 72 with the LDAP directory server application 80. This implementation would have the benefit of a smaller footprint by executing on the same hardware.

The unencrypted TCP/IP port number 389 and encrypted TCP/IP port number 636 are standard LDAP protocol ports otherwise used in prior art delivery of LDAP based services over TCP/IP. Therefore, according to the invention, with the introduction of the LDAP validation proxy 52, all LDAP client issued LDAP messages intended for an associated directory server 54 which should have otherwise been listening to TCP/IP port members 389 and 636 are intercepted by LVP server 52. At the network addressing level, the LVP server 52 is provided for this purpose with an address (such as an IP address according to this exemplary implementation) representing the LVP server 52 as an LDAP directory server to the LDAP client 50. The LVP server 52 is represented as an LDAP client to the directory server 54. Similarly, the directory server 54, in issuing LDAP response messages, uses TCP/IP port member XYZ to send the response messages towards the LDAP client 50. The response messages are intercepted by the LVP server 52, which may process the response messages before forwarding them to the client 50 via the standard LDAP port 74. Therefore, the LVP is a middleware solution enabling LDAP message processing in a layer interposed between the LDAP client 50 and the directory server 54.

As described above, LDAP messaging is provided via TCP/IP ports. The invention is not limited to this implementation; any messaging entity associated with an underlying data transport protocol can be employed.

Also shown in FIG. 1 is a session information record 90 concerning a particular LDAP session. In accessing some services provided by the directory server 54, each LDAP client 50 establishes an LDAP session (hereinafter "session"). A session record 90 is created upon set-up of the session to maintain data pertinent to the session. For example, each session record 90 may keep in a session persistent store credentials 92 such as a user ID, a password, and an authentication method. Session related information having a persistency in accordance with a provided service, is stored in a shared global data store available to the LVP application 70. The invention is not limited to this session record specification; other types of session credentials may make use of certificates and the like. Authentication methods and the associated credentials relate to the art of access control detailed elsewhere.

Each session between a client 50 and directory server 54 established via the LVP 52 is enabled via a group of communication sockets, as will be explained below with respect to FIG. 3, a list of which is held in the session record 90, as shown at 94. The use of communication sockets such as TCP/IP sockets described in accordance with this exemplary embodiment should not be construed to limit the invention equivalents respecting other data transport protocols.

In each session, many requests can be validated concurrently as received in a rapid succession from the clients 50. For this purpose, the session information record 90 has a register 96 holding the number of outstanding requests. The LVP 52 also keeps track in the session information record 90 of the number of outstanding responses, via a register 98. The use of an outstanding request counter whose value is held in the register 96, and of an outstanding response counter whose value is held in the register 98, will be described in more detail below.

Figure 2:
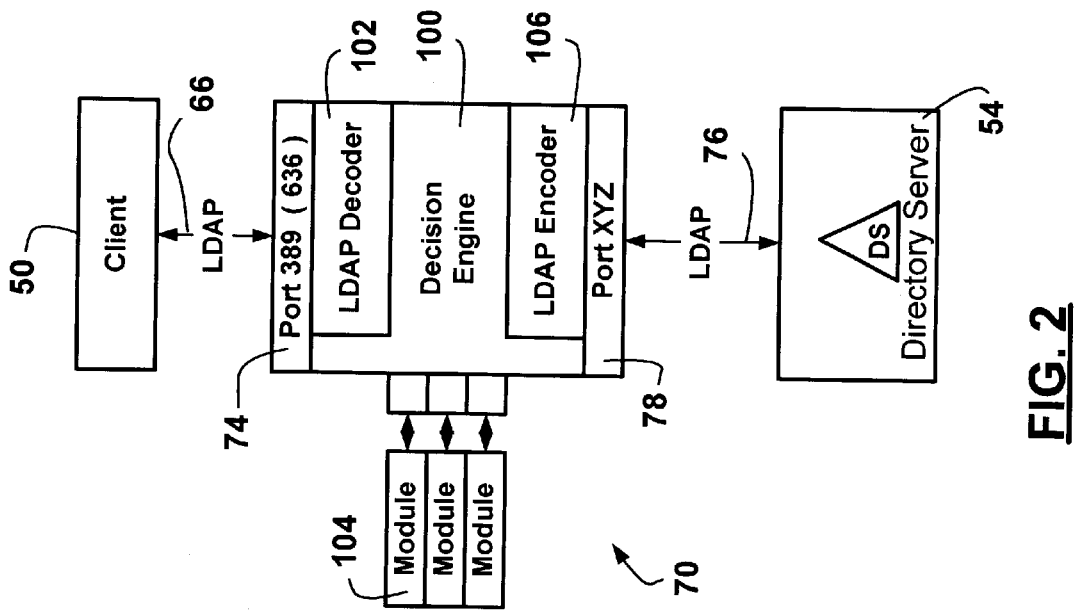
FIG. 2 is a schematic representation of functional components of the LDAP Validation Proxy of FIG. 1.

FIG. 2 shows the architecture of the LVP application 70 in accordance with the invention. The LVP application 70 includes a decision engine 100, an LDAP message decoding engine (hereinafter "decoder") 102, at least one LDAP message processing module or schema validation module (hereinafter "module") 104, and an LDAP message encoding engine (hereinafter "encoder") 106. In decoding an LDAP message, variables and objects known to the LVP application 70 may be instantiated at the LVP 52 according to attributes present in the LDAP message and the service provided. The variables and objects persist for the duration of the processing of the LDAP messages by the LVP application 70. The invention is not limited by the described persistency of instantiated data entities. Services can be envisioned which may benefit from a persistency of the instantiated variables and objects for the duration of an LDAP session or longer. For example, a simple service provided via session persistent variables would be one requiring accumulation of processing time for information access billing purposes.

Figure 3:
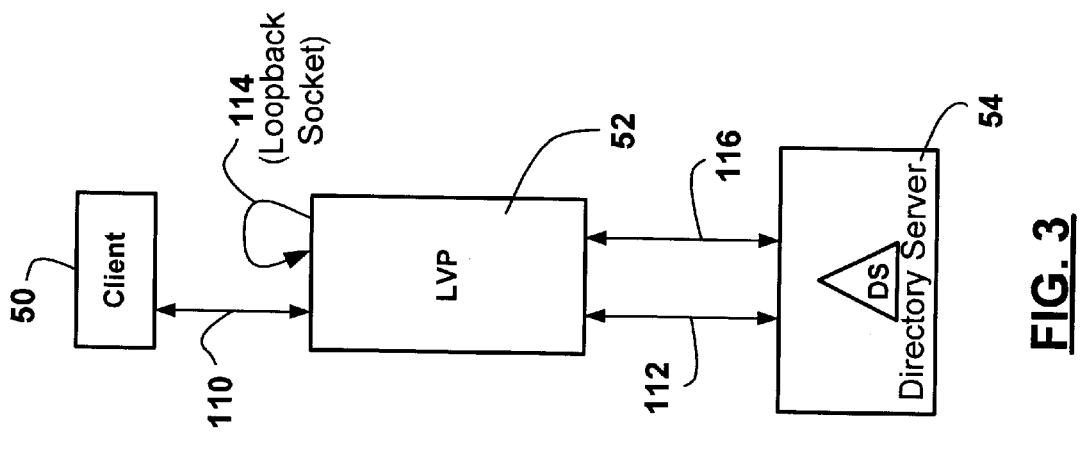
FIG. 3 is a connection diagram showing a configuration of sockets allocated per session in conveying LDAP messages between an LDAP client and a directory server in accordance with the present invention.

FIG. 3 shows TCP/IP socket usage according to the invention. TCP/IP sockets (hereinafter "sockets") are particular to the TCP/IP protocol. TCP/IP sockets have equivalents in other data transport protocols, as is known to a person skilled in the art of data transport and therefore shall not limit the invention. A client socket 110 is used to transport LDAP messages directed to the directory server 54 between the client 50 and the LVP 52. Socket 112 is used to transmit LDAP messages directed to the directory server 54 between the LVP 52 and the directory server 54. An LVP loopback socket 114 is used by the LVP 52 in executing a module 104, and particularly in providing side-effect functionality to LDAP message processing, thereby enabling the LVP 52 to issue LDAP request messages addressed to the directory server 54. Sockets 110 and 114 are associated with TCP/IP port 78. In processing the LVP initiated LDAP request messages, a socket 116 is used to provide communications between the LVP 52 and the directory server 54.

The LVP application 70 maintains knowledge of LDAP sessions as described above. The LVP application 70 may set up any number of sockets as necessary in providing a service. The LVP application 70 makes the client credentials 92 (seen in FIG. 1) available to the modules 104 enabling the modules 104 to create LDAP requests addressed to the directory server 54 on behalf of the client 50 as part of prescribed LDAP message processing.

Figure 4:
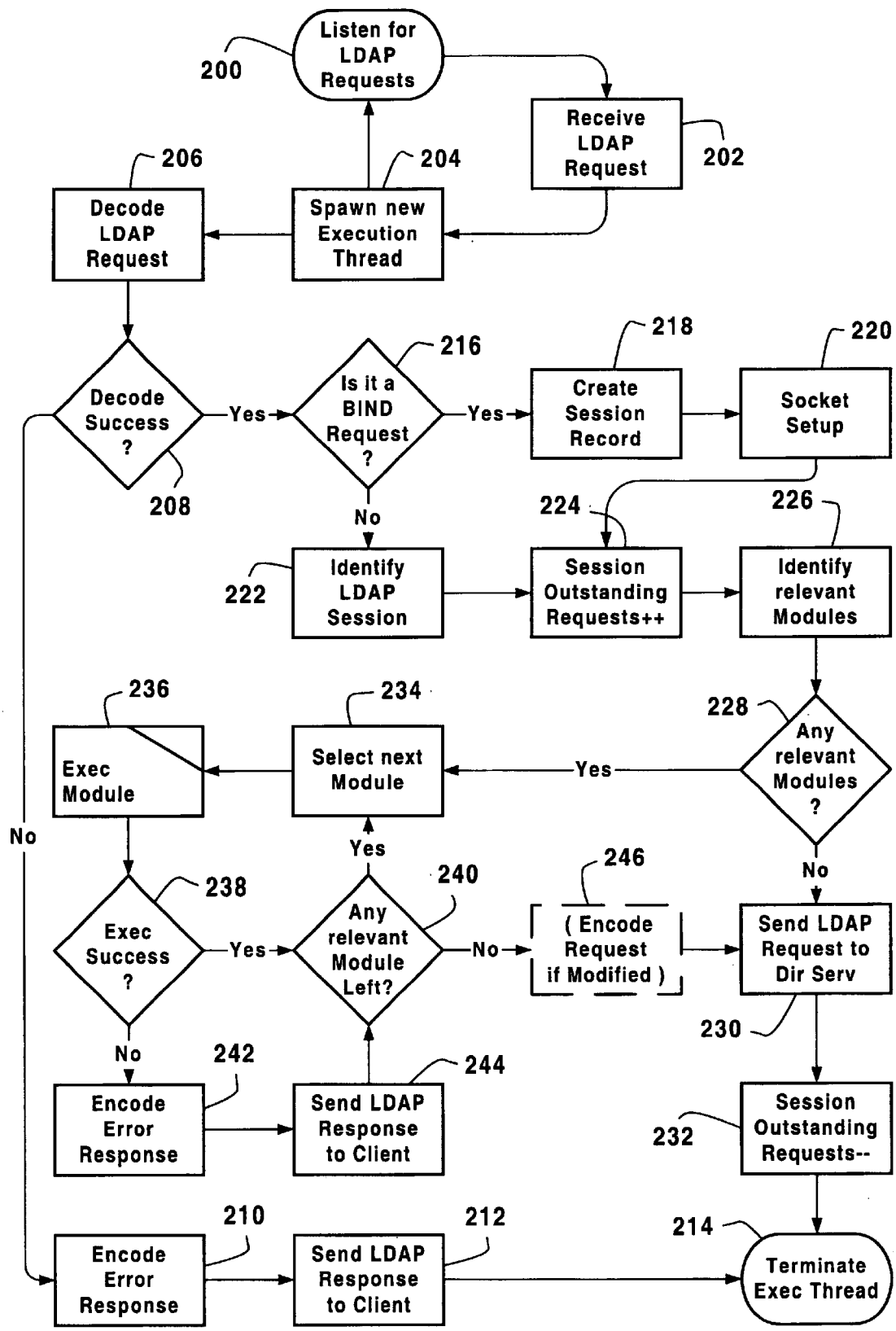
FIG. 4 is a flow diagram showing an exemplary process by which LDAP request messages are processed by an LDAP Validation Proxy.

FIG. 4 is a flow diagram showing an exemplary process by which LDAP request messages are intercepted and processed by the LDAP validation proxy server 52.

According to a preferred embodiment of the invention, the LVP application 70 is a multi-threading enabled software application. The LVP 52 is enabled to process LDAP messages respecting many different sessions. A request listening execution thread 150 (shown in FIGS. 5A and 5B) provides a port functionality on TCP/IP port 74 in step 200 shown in FIG. 4. The request listening thread 150 receives an LDAP request message in step 202. Having received the LDAP request, a new execution thread is spawned in step 204 and the request listening thread 150 returns to a state 200 in which it is listening for another LDAP request.

The newly spawned execution thread executes execution code implemented in the decision engine 100, takes over the processing of the received LDAP request in step 206 and decodes the LDAP request. A test is made as to whether the LDAP request was formulated correctly as sent and decoded successfully in step 208. If the decoding of the LDAP request failed, the encoder 106 is called to encode an error response into an LDAP response message, in step 210. The LDAP response message is sent to the client 50, in step 212, and the execution of the thread is terminated in step 214. As mentioned above, instantiated data entities such as variables and objects in decoding the LDAP request message are discarded in the thread termination step if not designated for a longer persistency.

If the decoding of the received LDAP request is successful (at step 208), and if the LDAP request is a "bind" request (as ascertained in step 216) signifying an LDAP message from a new client, a new LDAP session and associated session information record 90 are created in step 218. Authentication information is extracted from the decoded bind request message including for example: a user ID, a password, and an authentication method. In receiving the bind request, the decision engine 100 sets up the necessary sockets to support the new LDAP session, in step 220. Optionally, the setup of sockets 114 and 116 can be delayed until the LVP 52 needs to issue LDAP requests addressed to the directory server 54, thereby providing an optimization of usage of system resources.

If the decoded LDAP request message is found not to be a "bind" request (at step 216), the LDAP session is identified in step 222. The outstanding request counter for the session is incremented by 1, in step 224.

Relevant modules 104 for processing the request are identified in step 226. Each module 104 is registered with the decision engine 100, including indications concerning conditions upon which the module is to be called for execution. Applicant's co-pending application referred to above describes in greater detail the registration process and is incorporated herein by reference. Alternatively, all modules 104 can be called in processing an LDAP message but this is not a preferred implementation. If no relevant modules 104 are found (in step 228), then a copy of the LDAP request is sent to the directory server 54 in step 230, and the outstanding request counter 96 for the session is decremented by 1 (in step 232). If relevant modules 104 are identified (in step 228), then a next module 104 is selected in step 234 and called to execute in step 236.

A flow diagram showing an exemplary process of execution of an LDAP message processing module 104 is shown in detail in FIG. 7 and explained below. In processing LDAP request messages, the execution of a module 104 (step 236) typically returns a "true" or "false" value depending on the success of the execution of the module 104. If the processing of the request was completed successfully (in step 238), and if there are any relevant modules 104 left to be executed (step 240), the execution cycle starts anew in step 234 by selecting a next module 104.

If the execution of the module is found to have failed (step 238), an error response is encoded in step 242 by the LDAP encoder 106. A resulting LDAP response message is sent to the client 50 in step 244 and the execution of the thread resumes at step 240, performing a check as to whether there are any relevant modules left to execute.

According to another implementation (not shown), errors can be accumulated, encoded and sent to the client 50 in a single LDAP response message after all of the relevant validation modules 104 have been called.

A service can be provided wherein errors encountered in processing LDAP messages can be provided to the client 50 in human readable format. This functionality may be provided perhaps by at least one LDAP message processing module 104 and may be responsive to at least one session persistent variable indicating information such as the preferred language in error reporting.

The execution of a validation module 104 in step 236 may modify the LDAP request message received in step 202 according to a provided service. If this is the case, then, on not finding any more relevant modules to be called for execution in step 240, the modified request message is encoded in step 246 by the LDAP encoder 106 and sent to the directory server 54 in step 230. If the request message is not modified, the received LDAP request message is sent in step 230. On sending the LDAP request message to the directory server 54, the outstanding request counter is decremented by 1 in step 232, and the execution of the thread is terminated in step 214.

Figure 5B:
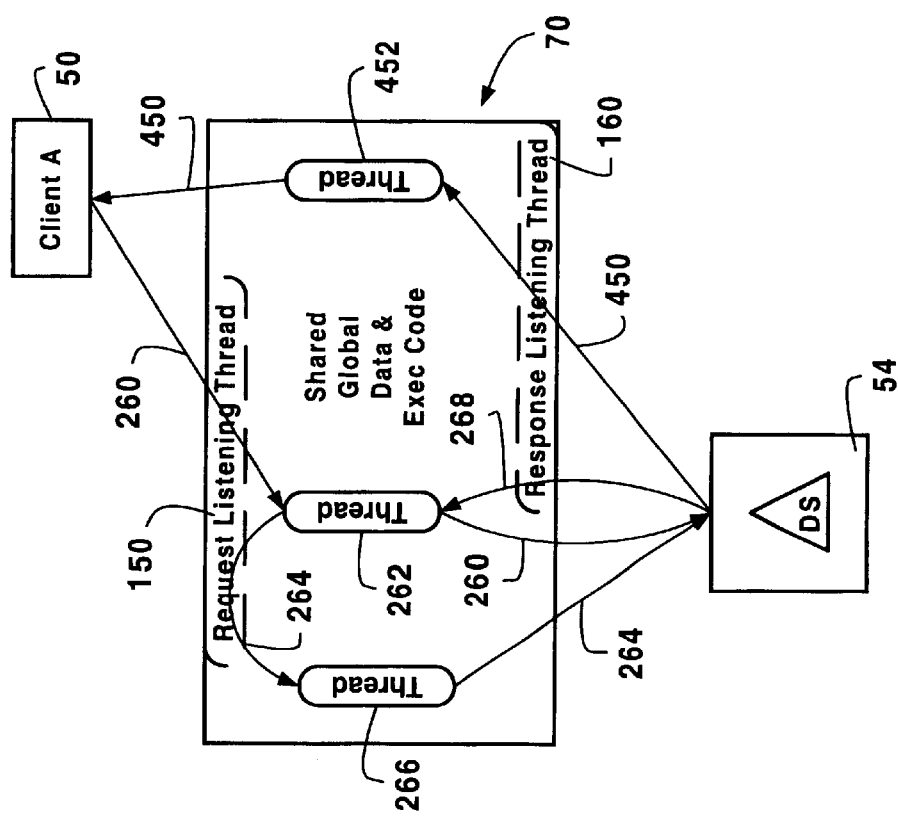
FIGS. 5A and 5B are diagrams showing exemplary processing of LDAP messages by an LDAP Validation Proxy employing multiple execution threads.
Figure 5A:
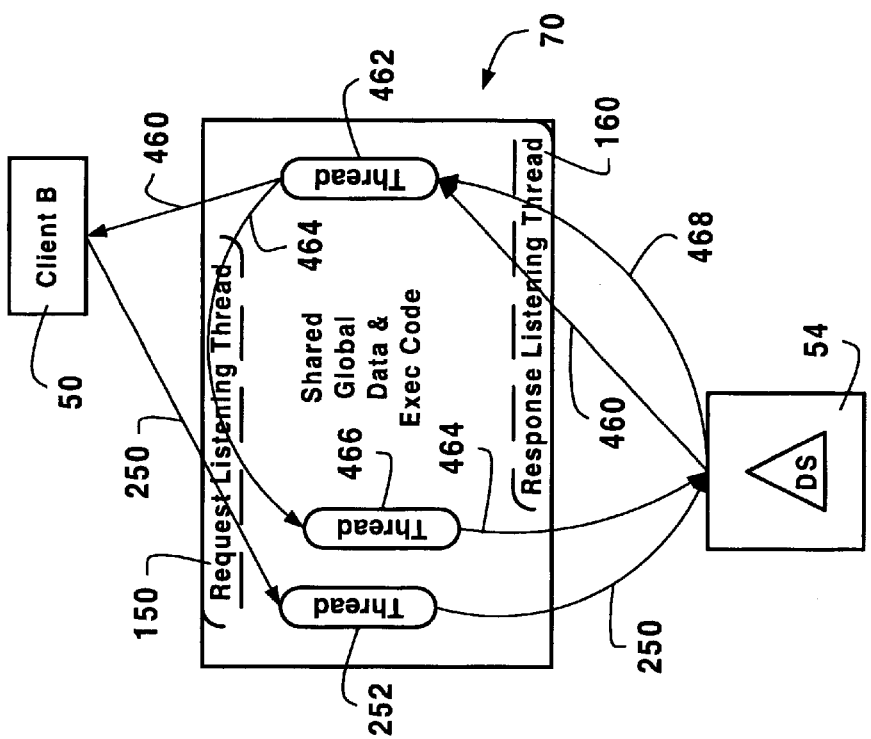

FIGS. 5A and 5B are schematic diagrams showing exemplary operations of the LVP application 70 in processing messages. The arrows in the two diagrams represent LDAP messages.

An example of a simple LDAP request message validation (eg. not necessitating side-effect processing during validation), is one in which the client 50, shown in FIG. 5A, issues request message 250 which is intercepted by the LVP validation proxy 70, and in particular by the request listening thread 150. An execution thread 252 is spawned, as described with reference to FIG. 4, in which the LDAP request message 250 is processed. On successfully processing the request message the LDAP request message 250 is sent from the LVP 52 to the directory server 54.

An example of processing of a message necessitating side-effect processing is shown in FIG. 5B. An LDAP request message 260 is sent by the client 50. The LDAP request message 260 is intercepted by the request listening thread 150. The request listening thread 150 spawns an execution thread 262 which begins processing the request message 260. In processing the request message 260, it is necessary to perform actions providing side-effect processing. Thread 262 issues an LDAP request message 264 via socket 114 (FIG. 3) addressed to the directory server 54 and waits. The request message 264 is intercepted by the LVP 52, and in particular by the request listening thread 150 which spawns another execution thread 266 which processes the LDAP request message 264. In successfully processing the LDAP request message 264, the thread 266 forwards the LDAP request message 264 to the directory server 54 via socket 116. The directory server 54 issues an LDAP response 268 via socket 116, which is intercepted by the LVP 52 and, in particular, by a response listening thread 160 which forwards the LDAP response message 268 to the waiting thread 262. On receiving the LDAP response message 268, the thread 262 resumes execution and forwards the initial LDAP request message 260 to the directory server 54.

Figure 6:
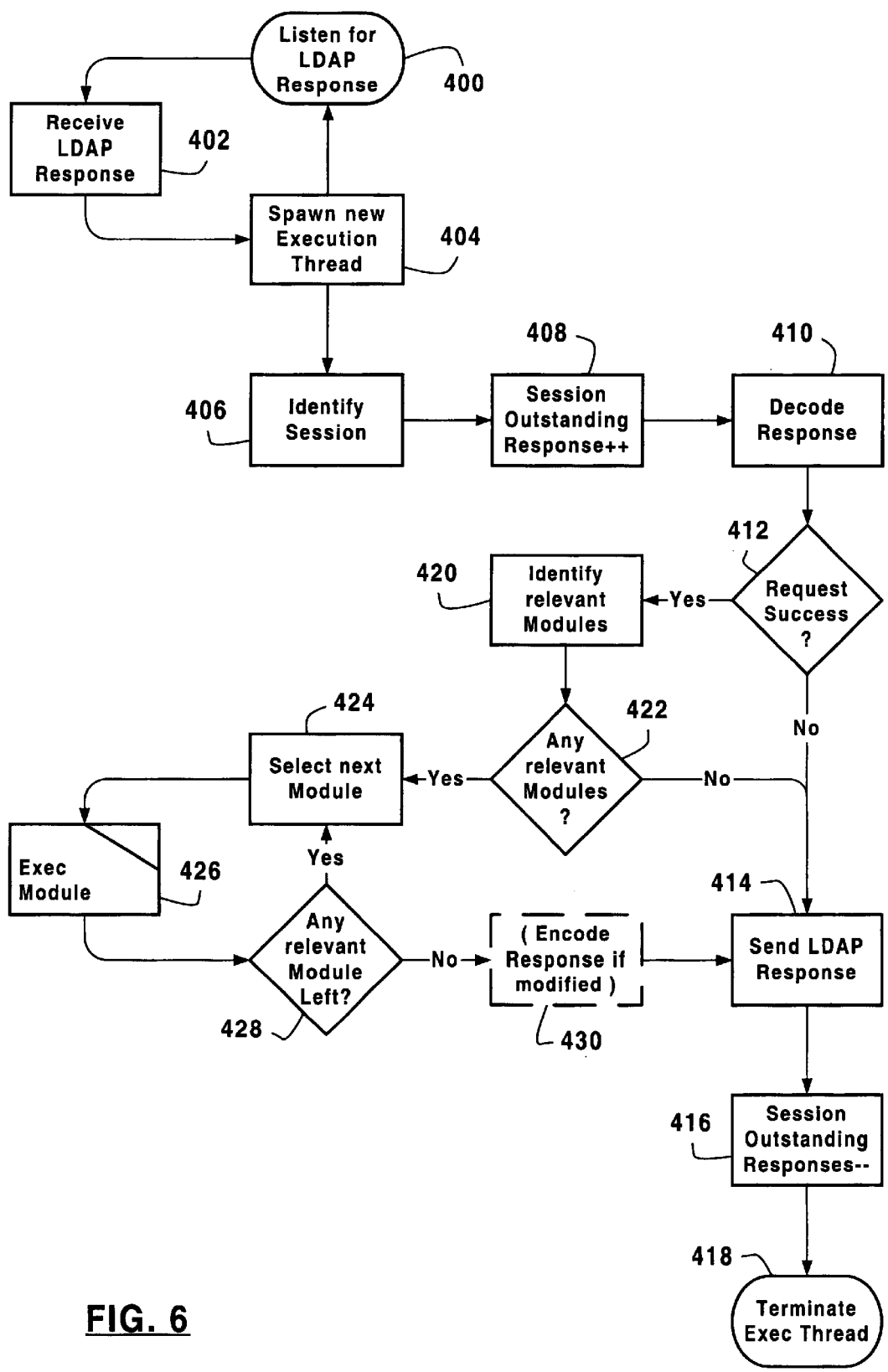
FIG. 6 is a flow diagram showing an exemplary process by which LDAP response messages are processed by an LDAP Validation Proxy.

FIG. 6 shows a flow diagram showing an exemplary process by which an LDAP response message is processed by the LVP 52.

The response listening thread 160 (FIGS. 5A & 5B) listens for an LDAP response message in step 400. The LDAP response message is received in step 402. On receiving the LDAP response message, the response listening thread 160 spawns a new execution thread in step 404 to process the received LDAP response message.

An LDAP session pertaining to the received LDAP response message is identified in step 406. A session outstanding response counter is incremented by 1 in step 408 and the LDAP response message is decoded in step 410 into a response message. The decoding of the LDAP response message in step 410 should not fail.

A check is made in step 412 as to whether the LDAP request message that led to the LDAP response message was successfully processed by the directory server 54. If the processing of the original request message was unsuccessful, then the LVP 52 sends the LDAP response message to the client 50 in. step 414. The session outstanding response counter is decremented by 1 (in step 416), and the thread terminates execution in step 418. It is envisioned that -the invention encompass the implementation of some level of failure recovery. Failure recovery may also be implemented via a module.

If the original request message was processed successfully by the directory server 54, relevant modules 104 for processing the response message are identified in step 420. If no relevant modules are identified, then the original received LDAP response message is forwarded in step 414 to the client 50, the session outstanding response counter is decremented by 1 (in step 416), and the thread terminates in step 418.

If there are relevant modules 104 for processing the response message, then a relevant module 104 is selected in step 424. The relevant module 104 is executed in step 426, and then a check is made as to whether there are any relevant modules left to be called for execution (step 428). If there are any relevant modules left in step 428, the execution of the thread resumes in step 424.

The execution of the module 104 may modify the response message. In this case, after all relevant modules 104 have executed, the execution thread requests the encoding of the modified response message in step 430. The encoded LDAP response message is sent to the client 50 in step 414. The session outstanding response counter is decremented by 1 in step 416, and the execution of the thread is terminated in step 418.

Returning again to FIG. 5B, an example of LDAP response message validation is shown in which an LDAP response message 450 is intercepted by the response listening thread 160. The response listening thread 160 spawns an execution thread 452. After successfully validating the LDAP response message 450, the thread 452 sends the LDAP response message 450 to the client 50.

Another example of LDAP response message processing is shown in FIG. 5A with respect to LDAP response message 460 necessitating side-effect processing. The LDAP response message 460 is intercepted by the response listening thread 160 which spawns an execution thread 462. In processing the LDAP response message 460, the processing of the response message requires an action having a side-effect, and thus the execution thread 462 issues an LDAP request message 464 which is addressed to the directory server 54 via socket 114 (FIG. 3) and waits.

The LDAP request message 464 is intercepted by the LVP validation proxy 70 and, in particular, by the request listening thread 150. The request listening thread 150 in intercepting the LDAP request message 464 spawns an execution thread 466 which processes the LDAP request message 464. On successfully processing the LDAP request message 464, the thread 466 sends the LDAP request message 464 to the directory server 54 using socket 116. On processing the LDAP request message 464, the directory server 54 issues another LDAP response message 468. The LDAP response message 468 is intercepted by the response listening thread 160, which forwards the LDAP response message 468 to the waiting thread 462. Once the thread 462 receives the LDAP response message 468, the initial LDAP response message 460 is sent to the client 50.

Figure 7:
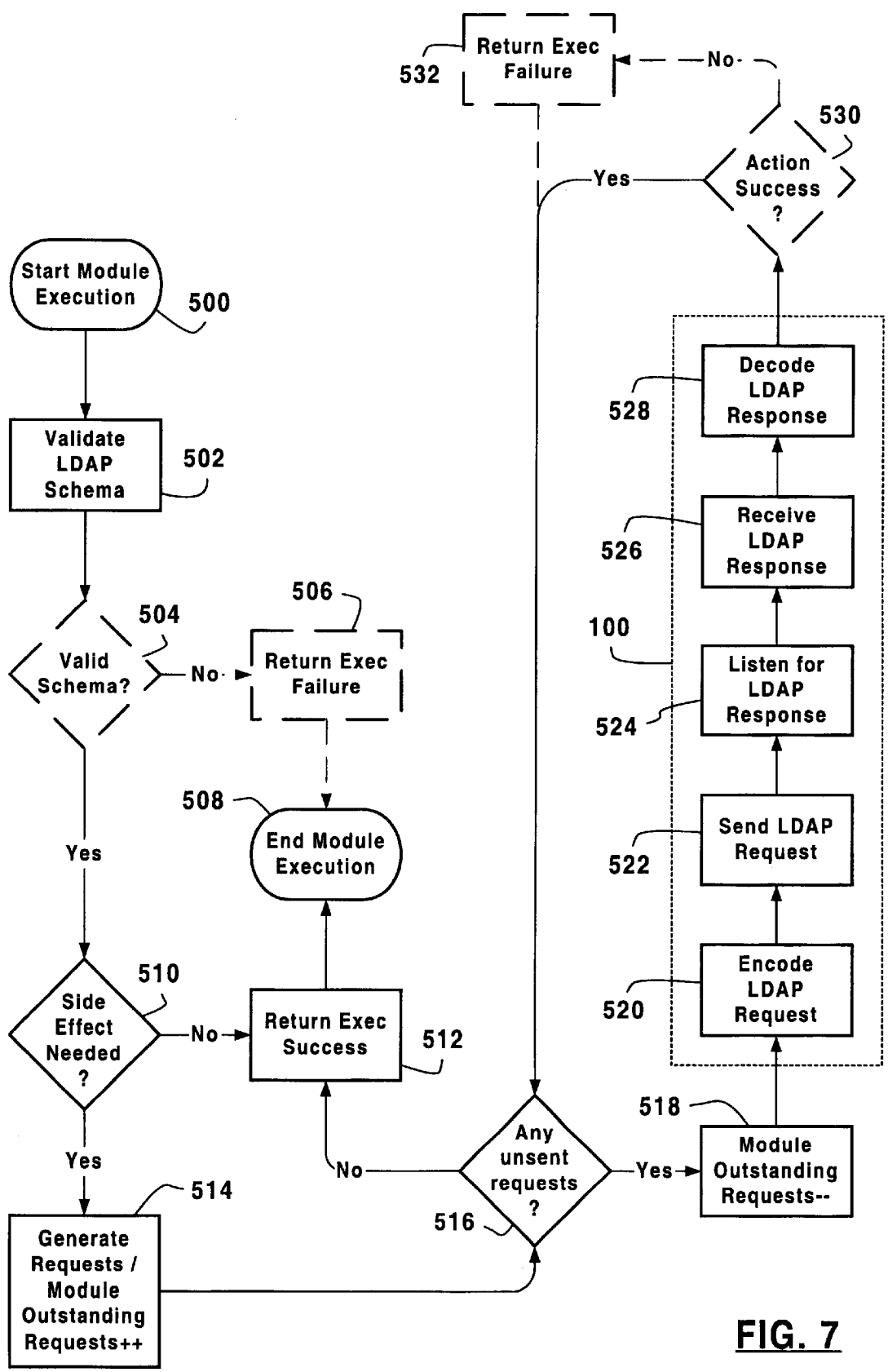
FIG. 7 is a flow diagram showing an exemplary execution process of a typical module.

FIG. 7 is a flow diagram showing an exemplary process by which a module 104 may operate in accordance with the invention. The execution of the module 104 is initiated at step 500. The validation is performed in step 502, for example by performing syntactic attribute checks against the schema in accordance with the methods of the module 104. If the schema validation fails, possibly due to a failed attribute check or the like (step 504), then the module 104 returns "false" (execution failure) in step 506 and terminates execution in step 508.

If the syntactic attribute checks are successful in step 504, then a check is made as to whether a side-effect is needed perhaps in performing semantic validation of the LDAP message, in step 510. If no side-effect is needed, then a "true" (execution success) is returned in step 512, and the execution of the module 104 is terminated in step 508.

If side-effects are determined to be needed in step 510, then the module generates necessary requests in step 514 and, as it does so, a module outstanding request counter is incremented by 1 for each generated request. These generated requests may be prioritized, if needed, in processing.

A module 104 may perform any of a wide range of actions in processing an LDAP message. The module 104 is not limited to sending LDAP request messages and checking attribute syntax, and the invention is not limited to such an implementation. A module 104 may: read information from a database, consult a completely separate directory server for information, send queries to a device to see if it is capable of performing any specific function(s), etc. The range of actions a module 104 can perform is, in principle, unlimited.

A check is performed as to whether there are any unsent requests in step 516. If there are unsent requests in step 516, one is selected, perhaps in priority sequence, the module outstanding request counter is decremented by 1 in step 518, and the request is passed to the decision engine 100, which encodes the request into an LDAP request in step 520. In step 512, the LDAP request message is directed to the directory server 54 for processing via socket 114.

The sent LDAP request message is intercepted by the LVP validation proxy 70 via the request listening thread 150 and processed according to the process shown in FIG. 4.

The decision engine 100 listens via the response listening thread 160 for an LDAP response from the directory server 54 in step 524. An LDAP response message is received by the response listening thread 160 in step 526 and is decoded by the decoder 102 in step 528. The decision engine 100 then sends the response message to the module 104.

The module 104 performs a check as to whether the action of the sent request message was successfully processed by the directory server 52 in step 530. If there was a failure, the validation module 104 returns "false" (execution failure) in step 532 and the execution of the module 104 returns to step 516 in which the module 104 selects another remaining unsent request. Failure recovery may be provided by the module 104.

It is to be noted that the process described above applies to all modules 104, namely modules 104 providing a request pre-processing, and a response post-processing. In providing response post-processing side-effects, steps 504 and 530 should not fail. Failure avoidance can be performed as a side-effect of pre-processing the request message generating the response.

According to the present invention, the capability of modules to modify requests can be adapted to provide schema translation. Schema translation effectively isolates vendor-specific client and directory server applications from each other. Thus, for example, the schema of a directory server can be modified and the corresponding necessary client side modifications can thus be delayed or may be rendered unnecessary. Schema translation also enables processing of client requests during a transition period of a schema upgrade, allowing a new schema description to be released, while clients using the old schema are still supported.

The ability of the LVP to encode LDAP messages enables the LVP to present an LDAP compliant interface for access perhaps via appropriately coded modules to information not stored in an LDAP compliant directory server. As mentioned above, modules 104 can be enabled to perform access queries to other information sources.

The invention enables consistent schema validation access for many different clients. The modules 104 enable enforcement of consistent validation against a particular directory object. class regardless of what client is issuing requests, thereby maintaining syntactic and semantic integrity of data stored in a directory.

The invention has been described with respect to directory access in the context of an LDAP session, i.e. session-bound messaging. A person skilled in the art will appreciate that the teachings of this invention can be equally applied to sessionless directory access.

Further, the teachings of this invention as described are not limited to embodiments in which a one-to-one relationship exists between the LVP 52 and the directory server 54. Besides the mentioned possible provision of services across multi-vendor directory servers, the directory servers can be distributed, as is known in the art, therefore leading to a one-LVP multi-directory server relationship. Directory server technology, particularly the ability of directory servers to route information access requests between themselves, also enables multiple-LVP single-directory server relationships and by extension multiple-LVP multi-directory server relationships. Although such embodiments are not shown, they would be, in view of the teachings presented herein, understood by persons skilled in the art.

The embodiments of the invention described above are intended to be exemplary only. The scope of the invention is therefore intended to be limited solely by the scope of the appended claims.

We claim:

1. A framework for open directory extensibility, comprising:
   a) a messaging entity adapted to send and receive directory messages sent to or received from a directory client, and adapted to send and receive directory messages sent to or received from a directory server;
   b) a directory message decoding engine (decoder) adapted to at least partially decode directory messages received by the messaging;
   c) a directory message encoding engine (encoder) adapted to encode directory messages; and
   d) at least one module adapted to process directory messages based on information conveyed in the message so that an integrity of information stored in the directory is maintained.

2. A framework as claimed in claim 1 wherein the messaging entity comprises first and second messaging entities, the first messaging entity being adapted to send and receive directory messages sent to or received from the directory client, and the second messaging entity being adapted to send and receive directory messages sent to or received from the directory server.

3. A framework as claimed in claim 1, wherein the directory is a Lightweight Directory Access Protocol (LDAP) compliant directory.

4. A framework as claimed in claim 1, further comprising a decision engine adapted to selectively activate the at least one module to process decoded directory messages.

5. A framework as claimed in claim 1, wherein the at least one module is further adapted to perform schema validation in processing of a directory message to determine semantic or syntactic conformance to the schema.

6. A framework as claimed in claim 5, wherein the at least one module is further adapted to perform at least one other prescribed action in processing a directory message.

7. A framework as claimed in claim 6, wherein the at least one module is further adapted to modify the directory message.

8. A framework as claimed in claim 6, wherein the prescribed actions provide a side-effect in processing the directory message.

9. A framework as claimed in claim 8, wherein the side-effect comprises the generation of information request messages addressed to the directory.

10. A framework as claimed in claim 9, wherein the framework is further adapted to intercept the side-effect information request messages addressed to the directory.

11. A framework as claimed in claim 10, wherein the intercepted information request messages are processed as any other information request message addressed to the directory.

12. A Lightweight Directory Access Protocol (LDAP) Validation Proxy (LVP) adapted to enable directory-independent message processing of LDAP messages exchanged between an LDAP client and an LDAP directory, the LVP comprising:
   a) a first messaging entity adapted to send and receive LDAP messages to and from the LDAP client;
   b) a second messaging entity adapted to send and receive LDAP messages to and from the LDAP directory;
   c) an LDAP message decoding engine (decoder) adapted to at least partially decode received LDAP messages;
   d) an LDAP message encoding engine (encoder) adapted to encode LDAP messages; and
   e) at least one module adapted to process LDAP messages based on information conveyed in the message so that an integrity of information stored in the directory is maintained.

13. An LVP as claimed in claim 12, wherein the LVP further comprises a decision engine adapted to selectively activate the at least one module to process LDAP messages.

14. An LVP as claimed in claim 12, wherein the at least one module is further adapted to perform schema validation in processing of an LDAP message to determine semantic or syntactic conformance to the schema.

15. An LVP as claimed in claim 12, wherein the at least one module is further adapted to perform at least one other prescribed action in processing an LDAP message.

16. An LVP as claimed in claim 15, wherein the at least one module is further adapted to modify the LDAP message.

17. An LVP as claimed in claim 15, wherein the prescribed action provides a side-effect in processing the LDAP message.

18. An LVP as claimed in claim 17, wherein the side-effect comprises the generation of LDAP request messages addressed to the directory.

19. An LVP as claimed in claim 18, wherein the LVP is further adapted to intercept the side-effect LDAP request messages addressed to the directory.

20. An LVP as claimed in claim 12, wherein the first messaging entity is further adapted to:
   a) receive LDAP request messages issued by the LDAP client and intended for the LDAP directory;
   b) transmit LDAP response messages to the LDAP client;
   c) transmit LDAP request messages generated by the LVP in processing LDAP request messages; and
   d) receive LDAP request messages transmitted by the LVP and addressed to the LDAP directory during the processing of the LDAP messages.

21. An LVP as claimed in claim 12, wherein the second messaging entity is further adapted to:
   a) transmit LDAP request messages to the LDAP directory; and
   b) receive LDAP response messages issued by the LDAP directory and intended for the LDAP client.

22. An LVP as claimed in claim 12, wherein the LVP farther comprises:
   a) first and second listening processes.

23. An LVP as claimed in claim 22, wherein messaging is provided via a Transport Control Protocol over Internet Protocol (TCP/IP).

24. An LVP as claimed in claim 23, wherein the first listening process is adapted to detect LDAP messages at a TCP/IP port having a prescribed TCP/IP port number.

25. An LVP as claimed in claim 24, wherein the first listening process is further adapted to:
   a) detect unencrypted LDAP messages at TCP/IP port number 389.

26. An LVP as claimed in claim 24, wherein the first listening process is further adapted to:
   a) detect encrypted LDAP messages at TCP/IP port number 636.

27. An LVP as claimed in claim 23, wherein the second listening process is adapted to detect LDAP messages at a TCP/IP port having a prescribed TCP/IP port number.

28. An LVP as claimed in claim 12, wherein the decoding engine is adapted to decode unencrypted LDAP messages.

29. An LVP as claimed in claim 12, wherein the decoding engine is adapted to decode encrypted LDAP messages.

30. An LVP as claimed in claim 12, wherein the LVP is adapted to provide session-less LDAP message processing.

31. An LVP as claimed in claim 12, wherein the LVP is adapted to provide session-bound LDAP message processing.

32. An LVP as claimed in claim 31, wherein the LVP maintains at least one session record corresponding to an LDAP session between the LDAP client and the LDAP directory.

33. An LVP as claimed in claim 32, wherein the at least one session record comprises:
   a) session credentials;
   b) connectivity information;
   c) a register representing a current number of outstanding requests; and
   d) a register representing a current number of outstanding responses.

34. An LVP as claimed in claim 33, wherein the connectivity information associated with the use of TCP/IP for message transport comprises a list of TCP/IP connection socket identifiers.

35. An LVP as claimed in claim 31, wherein the LVP is further adapted to extend the session credentials to LDAP request messages generated by the LVP in providing a side-effect in processing LDAP messages associated with an LDAP session.

36. An LVP as claimed in claim 12, wherein the decoding engine is further adapted to decode a message type from an LDAP message.

37. An LVP as claimed in claim 36, wherein the LVP is further adapted to extract authorization information from a decoded LDAP message of type "bind", the authorization information representing the client's credentials.

38. An LVP as claimed in claim 12, wherein the decoding engine is further adapted to decode an LDAP message into instances of constituent data entities from which the LDAP message was encoded.

39. A method of processing LDAP messages exchanged between an LDAP client and an LDAP directory, the method comprising the steps of:
   a) intercepting at least one LDAP message exchanged between the LDAP client and the LDAP directory;
   b) at least partially decoding the intercepted LDAP message;
   c) selectively executing prescribed processes against the intercepted LDAP message based on information conveyed in the message; and
   d) selectively forwarding an LDAP message on completing at least one prescribed process based on a success level of the completion of the prescribed process.

40. A method as claimed in claim 39, wherein the step of at least partially decoding the LDAP message further comprises a step of instantiating data entities having attributes specified in the LDAP message.

41. A method as claimed in claim 39, wherein the step of at least partially decoding the intercepted LDAP message further comprises a step of extracting an LDAP message type from the LDAP message.

42. A method as claimed in claim 41, wherein the step of extracting the LDAP message type further comprises a step of detecting a "bind" message type.

43. A method as claimed in claim 42, wherein the step of detecting the bind message type further comprises steps of:
   a) extracting authorization information from the LDAP message; and
   b) creating an LDAP session.

44. A method as claimed in claim 39, wherein the step of intercepting the LDAP message further comprises a step of establishing a message transport connection.

45. A method as claimed in claim 44, wherein the step of establishing the message transport connection with the directory using a TCP/IP protocol further comprises a step of setting up a loopback socket at the LVP.

46. A method as claimed in claim 39, further comprising, prior to the step of selectively executing a prescribed process against the LDAP message, a step of identifying a one of a plurality of modules relevant to the LDAP message.

47. A method as claimed in claim 39, wherein the step of executing the prescribed process further comprises a step of performing a side-effect action.

48. A method as claimed in claim 47, wherein the step of performing the side-effect action further comprises steps of:
   a) generating an information request; and
   b) issuing the information request message.

49. A method as claimed in claim 48, wherein the information request message is an LDAP request message addressed to the LDAP directory.

50. A method as claimed in claim 49, wherein the information request message generated by the LVP is an LDAP request message that loops back to the LVP.

51. A method as claimed in claim 49, wherein the LDAP request message addressed to the LDAP directory is processed in a step of providing schema translation.

52. A method as claimed in claim 48, wherein the information request message is addressed to another directory.

53. A method as claimed in claim 48, wherein the information request message is an information access request message directed to a database.

54. A method as claimed in claim 39, wherein the step of selectively forwarding an LDAP message on completing the prescribed process, if the success level signifies a processing error, the method further comprises a step of encoding at least one LDAP response message addressed to the LDAP client to report the error.

55. A method as claimed in claim 54, wherein the detecting of processing errors further comprises steps of:
   a) accumulating information about the errors; and
   b) encoding a one LDAP error response message directed to the LDAP client reporting the accumulated information about the errors.

56. A method as claimed in claim 54, wherein encoding the at least one LDAP response message reporting the error further comprises a step of issuing the LDAP error response message to the LDAP client.

57. A method as claimed in claim 56, wherein encoding the at least one LDAP response message prior to issuing the LDAP response message further comprises a step of encoding a human readable error string in the LDAP response message.

58. A method as claimed in claim 39, wherein the step of selectively forwarding an LDAP message in completing the prescribed process, if the success level signifies a modification of the intercepted LDAP message, further comprises a step of encoding the modified LDAP message before forwarding the modified LDAP message.

59. A method as claimed in claim 39, wherein on completion of the prescribed process, if the success level signifies correct processing of the intercepted LDAP message, the method further comprises a step of forwarding the intercepted LDAP message.

* * * * *